United States Patent [19]

Watanabe et al.

[11] Patent Number: 5,189,005

[45] Date of Patent: Feb. 23, 1993

[54] ELECTROCATALYST AND PROCESS OF PREPARING SAME

[75] Inventors: Masahiro Watanabe, Yamanashi, Japan; Paul Stonehart, Madison, Conn.; Kazunori Tsurumi, Kanagawa, Japan; Nobuo Yamamoto, Kanagawa, Japan; Noriaki Hara, Kanagawa, Japan; Toshihide Nakamura, Kanagawa, Japan

[73] Assignees: Tanaka Kikinzoku Kogyo K.K., Tokyo, Japan; Stonehart Associates, Inc., Madison, Conn.

[21] Appl. No.: 863,118

[22] Filed: Apr. 3, 1992

[51] Int. Cl.$^5$ ............................................. B01J 23/89
[52] U.S. Cl. .................................... 502/326; 502/101; 429/40; 429/44
[58] Field of Search ................. 502/101, 326; 429/40, 429/424

[56] References Cited

U.S. PATENT DOCUMENTS 5,024,905  6/1991  Itoh et al. ........................ 502/326 X
5,079,107  1/1992  Jalan ................................ 502/326 X Primary Examiner—W. J. Shine
Attorney, Agent, or Firm—Sughrue, Mion, Zinn, Macpeak & Seas

[57] ABSTRACT

Disclosed herein are a platinum alloy catalyst comprising an electroconductive support and platinum-nickel-cobalt alloy particles having an ordered structure supported on the electroconductive support, and a process of preparing the catalyst. The catalyst possesses higher activity and longer durability because of its ordered structure.

2 Claims, 2 Drawing Sheets

ELECTROCATALYST AND PROCESS OF PREPARING SAME

BACKGROUND OF THE INVENTION

The present invention relates to a platinum alloy electrocatalyst having an ordered structure which can be suitably employed in a phosphoric acid type fuel cell.

A platinum alloy catalyst employed as a cathode catalyst of a phosphoric acid type fuel cell (hereinafter referred to as PAFC) having a higher oxygen reduction activity than that of a pure platinum catalyst has been developed, and for attaining the further durability the development is directed to a platinum alloy catalyst having an ordered structure. Although a Pt-Ni-Co catalyst is well known in prior publications to exhibit a high oxygen reduction activity, no description can be found that the Pt-Ni-Co catalyst possesses the ordered structure. While several ordered catalysts have been proposed, the Pt-Ni-Co catalyst is not suggested to have an ordered structure.

Since a catalyst for a fuel cell is generally employed in 100% phosphoric acid at a temperature from 190° to 210° C., dissolution of alloy particles and decrease of a surface area of a metal due to sintering occur to accelerate deterioration of the performance. In order to overcome these disadvantages, a catalyst for a fuel cell with a higher oxygen reduction activity and a high durability is requested.

In order to respond to this request, a certain ordered alloy (for example, a platinum-iron-cobalt-copper alloy catalyst) has been proposed (U.S. Pat. No. 4,711,829). The present inventors have investigated various platinum alloy catalysts with an ordered structure which possess less dissolution of metals, less surface area decrease and more durability than the above four element catalyst to reach the present invention.

SUMMARY OF THE INVENTION

Accordingly, an object of the present invention is to provide an electrocatalyst having an ordered structure and a process of preparing the electrocatalyst.

Another object is to provide an electrocatalyst especially useful in a fuel cell and a process of preparing the electrocatalyst.

A further object is to provide an electrocatalyst with a higher oxygen reduction activity and a higher durability and a process of preparing the electrocatalyst.

In accordance with one aspect of the present invention, there is provided a platinum alloy catalyst which comprises an electroconductive support and platinum-nickel-cobalt alloy particles having an ordered structure supported on the electroconductive support.

Even if the platinum alloy electrocatalyst of this invention is employed at an elevated temperature, the crystal structure of this catalyst is seldom distorted to deteriorate the catalyst performance because of its order so that the above catalyst can be employed, especially in a fuel cell, with a stabilized high activity for a long period of time.

In accordance with another aspect, there is provided a process of preparing a platinum alloy electrocatalyst which comprises supporting platinum, nickel and cobalt on an electroconductive support and alloying the metals to support the platinum-nickel-cobalt ternary alloy particles on the electroconductive support by heating characterized in that the thermal alloying is performed at the temperature range from 600° C. to less than 800° C. to form the alloy particles having an ordered structure.

The platinum-nickel-cobalt ternary alloy catalyst having an ordered structure can be obtained by means of the thermal alloying in the temperature range from 600° C. to less than 800° C., especially around 650° C. so that the electrode can be employed for a long period of time maintaining stabilized high activity.

BRIEF DESCRIPTION OF THE DRAWINGS

FIG. 1 (B) shows an X-ray diffraction pattern of an ordered alloy of Example 1;

FIGS. 1 (C), (D) and (E) are ASTM card data of X-ray diffraction patterns of element cobalt, nickel and platinum, respectively;

DETAILED DESCRIPTION OF THE INVENTION

Figure 1:
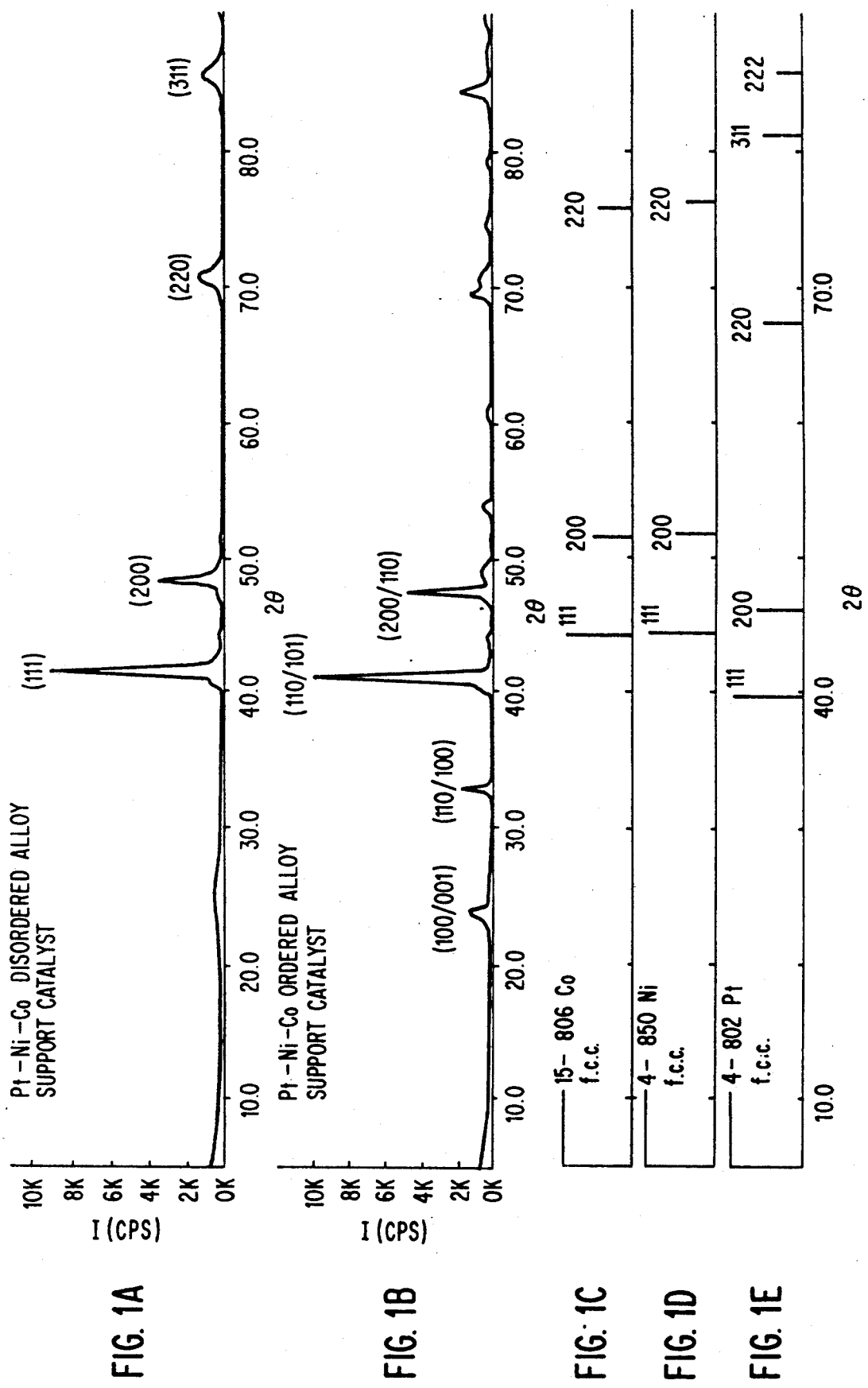
FIG. 1 (A) shows an X-ray diffraction pattern of an alloy having no ordered structure of Comparative Example 1.

The present inventors have investigated the heating temperature of the alloying of the platinum-nickel-cobalt ternary catalyst which was recognized not to possess an ordered structure to find that the ordered structure can be formed in the temperature range from 600° C. to less than 800° C.

The alloying temperature of the platinum-nickel-cobalt ternary alloy was 900° C. or more in the prior art, and this temperature range is outside that of the present invention.

However, as mentioned before, by suppressing the heating temperature of the alloying, the platinum-nickel-cobalt ternary alloy having the ordered structure can be prepared.

The ordered alloy means in this invention an alloy in which each metal in alloy particles essentially composed of platinum, nickel and cobalt supported on an electroconductive support is arranged in a certain pattern.

Although the support employed in this invention is not restricted as long as it is electroconductive, such a carbon support as acetylene black and graphitized furnace black can be preferably employed.

When the platinum-nickel-cobalt alloy particles are supported on this support, any process can be employed as long as the alloying is performed in the above temperature range. While a thermal decomposition method is not preferable which comprises decomposing, for example, nitrates of metals at an elevated temperature to convert into the corresponding metals and alloying the metals since the heating temperature is likely to rise over 800° C., a reduction method is preferable which comprises reducing, for example, organic acid salts of metals by means of hydrogen or any other reductant and alloying the reduced metals in the temperature range from 600° C. to less than 800° C.

The formation of the ordered alloy is confirmed according to a conventional method by the appearance of two peaks of (100) or (001) and (110) and (100) which are characteristic of the ordered alloy among the crystal lattice surfaces indicated by means of the Miller indices, at a lower angle side than the main peaks (2θ) of (111) and (101) in the X-ray diffraction pattern of the obtained alloy catalyst. The two Miller indices are indicated for one diffraction peak employing "or" because it remains uncertain whether the ordered structure of the platinum-nickel-cobalt alloy is a face-centered cubic lattice or a face-centered tetragonal lattice, and the surface indices based on the respective diffraction peaks are different depending on the crystal system. In either case, the above mentioned characteristic peaks appear as a result of the formation of the ordered structure having one of the two face-centered structures.

Because of its crystal structure, the thus obtained ordered alloy catalyst maintains its high activity for a long period of time and the deterioration of the performance seldom occurs even if it is employed at a relatively high temperature.

EXAMPLES

The present invention will now be described in detail in connection with the following Examples. However, these Examples are not intended to limit the scope of the present invention.

EXAMPLE 1

An aqueous solution of 10% ammonium hydroxide was added to 20 ml of an aqueous solution containing 1.54 mmol of nickel formate and 1.54 mmol of cobalt acetate until the pH reached 10. 6 g of a platinum-carbon catalyst prepared by supporting 10% in weight of platinum metal particles having a specific surface area of about 140 m$^2$/g on an acetylene carbon support having a specific surface area of about 100 m$^2$/g. The slurry obtained was dried at 65° C. to evaporate the liquid in the slurry to form a dried-up mass. After this mass was ground, it was treated in a 10% hydrogen flow (balance: nitrogen) at 250° C. for 30 minutes to reduce the nickel salt and the cobalt salt. Then, in the same flow, the platinum, the nickel and the cobalt were alloyed for 10 hours after the thermal treatment temperature was elevated to 650° C.

The ternary alloy catalyst thus obtained of which a composition ratio was 2:1:1 (Pt:Ni:Co, atomic ratio) was examined by X-ray diffraction. The diffraction angle of the platinum was shifted to a higher angle side to suggest the alloying with the nickel and the cobalt. The alloy particle size calculated from the diffraction line width was 40 Å. As shown in FIG. 1 (B), two diffraction peaks appearing in a lower diffraction angle side than the diffraction angle of 41.5° (diffraction angle: 2θ) suggested the formation of the ordered alloy.

EXAMPLE 2

A platinum-nickel-cobalt ternary catalyst was prepared in accordance with the same conditions of Example 1 except that thermal treatment was conducted at first at 900° C. for one hour and then at 650° C. for 10 hours in place of the thermal treatment at 650° C. for 10 hours of Example 1.

The catalyst was examined by means of X-ray diffraction. The diffraction angle of the platinum was shifted to a higher angle side to suggest the alloying with the nickel and the cobalt. The alloy particle size calculated from the diffraction line width was 50 Å. Two diffraction peaks appeared in a lower diffraction angle side in the same manner as Example 1 which suggested the formation of the ordered alloy.

EXAMPLE 3

A platinum-nickel-cobalt ternary catalyst was prepared in accordance with the same conditions of Example 1 except that thermal treatment was conducted at 700° C. for 10 hours in place of the thermal treatment at 650° C. of Example 1.

The catalyst was examined by means of X-ray diffraction. The diffraction angle of the platinum was shifted to a higher angle side to suggest the alloying with the nickel and the cobalt. The alloy particle size calculated from the diffraction line width was 45 Å. Two diffraction peaks appeared in a lower diffraction angle side in the same manner as Example 1 which suggested the formation of the ordered alloy. However, the respective ratios of the height of the two peaks to the main peak of this Example were about one-half of those of the Example 1.

EXAMPLE 4

A platinum-nickel-cobalt ternary catalyst was prepared in accordance with the same conditions of Example 1 except that thermal treatment was conducted at 600° C. for 10 hours in place of the thermal treatment at 650° C. of Example 1.

The catalyst was examined by means of X-ray diffraction. The diffraction angle of the platinum was shifted to a higher angle side to suggest the alloying with the nickel and the cobalt. The alloy particle size calculated from the diffraction line width was 35 Å. Two diffraction peaks appeared in a lower diffraction angle side in the same manner as Example 1 which suggested the formation of the ordered alloy. However, the respective ratios of the height of the two peaks to the main peak of this Example were about three-fourth of those of the Example 1.

COMPARATIVE EXAMPLE 1

A platinum-nickel-cobalt ternary catalyst was prepared in accordance with the same conditions of Example 1 except that thermal treatment was conducted at 900° C. for 11 hours in place of the thermal treatment at 650° C. of Example 1.

The catalyst was examined by means of X-ray diffraction. The diffraction angle of the platinum was shifted to a higher angle side to suggest the alloying with the nickel and the cobalt. The alloy particle size calculated from the diffraction line width was 65 Å. Different from Example 1, no diffraction peaks appeared in a lower diffraction angle side than the main peak as shown in FIG. 1 (A).

COMPARATIVE EXAMPLE 2

A platinum-nickel-cobalt ternary catalyst was prepared in accordance with the same conditions of Example 1 except that thermal treatment was conducted at 800° C. for 10 hours in place of the thermal treatment at 650° C. of Example 1.

The catalyst was examined by means of X-ray diffraction. The diffraction angle of the platinum was shifted to a higher angle side to suggest the alloying with the nickel and the cobalt. The alloy particle size calculated from the diffraction line width was 60 Å. No diffraction peaks appeared in a lower diffraction angle side than the main peak in the same manner as Comparative Example 1.

COMPARATIVE EXAMPLE 3

A platinum-iron-cobalt-copper four-element face-centered tetragonal ordered alloy catalyst was obtained as follows.

81 g of carbon black (Vulcan XC-72R) of which a specific surface area was 110 m$^2$/g was added to 150 ml of deionized water containing 4.0 g of glacial acetic acid to make a slurry. This slurry together with an amine was added to and dissolved in an aqueous solution containing 9.0 g of platinum as H$_2$Pt(OH)$_6$. After the temperature of the mixed solution was raised to 95° C. and was kept for 30 minutes, the solution was cooled to room temperature. After the washing and drying, a platinum supported catalyst having a specific surface area of 120 m$^2$/g was obtained.

50 g of this catalyst was dispersed in one liter of deionized water employing supersonic waves to make slurry. To this slurry, 150 ml of an aqueous solution of ferric nitrate (III) containing 0.72 g of iron was added while stirring, and the pH of the slurry was adjusted to 8.0 by adding dropwise a diluted aqueous solution of 5% hydrazine. After one hour stirring, filtration, washing and drying, the slurry was heated in a 7% hydrogen flow at 900° C. and was allowed to stand until it was cooled to room temperature to obtain a platinum-iron (atomic ratio; 67:33) alloy catalyst.

50 g of this catalyst was dispersed in one liter of deionized water employing supersonic waves to make slurry. To this slurry, 75 ml of an aqueous solution containing 0.38 g of cobalt as cobalt nitrate (II) and 0.41 g of copper as cupric nitrate (II) was added while stirring, and the pH of the slurry was adjusted to 8.0 by adding dropwise a diluted aqueous solution of 5% hydrazine. After filtration, washing and drying, the alloying was conducted in the same manner as the above alloying of the platinum and the iron to obtain a platinum-iron-cobalt-copper (atomic ratio; 50:17:17:17) four-element face-centered tetragonal ordered alloy catalyst.

COMPARATIVE EXAMPLE 4

A platinum-nickel-cobalt ternary catalyst was prepared in accordance with the same conditions of Comparative Example 1 except that thermal treatment was conducted at 900° C. for one hour in place of the thermal treatment at 900° C. for 11 hours of Comparative Example 1.

The catalyst was examined by means of X-ray diffraction. The diffraction angle of the platinum was shifted to a higher angle side to suggest the alloying with the nickel and the cobalt. The alloy particle size calculated from the diffraction line width was 35 Å. No diffraction peaks appeared in a lower diffraction angle side than the main peak in the same manner as Comparative Example 1.

COMPARATIVE EXAMPLE 5

A platinum-nickel-cobalt ternary catalyst was prepared in accordance with the same conditions of Comparative Example 1 except that thermal treatment was conducted at 500° C. for 10 hours in place of the thermal treatment at 900° C. for 11 hours of Comparative Example 1.

The catalyst was examined by means of X-ray diffraction. The diffraction angle of the platinum was shifted to a higher angle side to suggest the alloying with the nickel and the cobalt. The alloy particle size calculated from the diffraction line width was 30 Å. No diffraction peaks appeared in a lower diffraction angle side than the main peak in the same manner as Comparative Example 1.

The relation among the heating temperature and time, the alloy structure and the diffraction peak is shown in Table 1, and it is apparent that the alloys having the ordered structure can be obtained as a result of the alloying at the temperature from 600° C. to less than 800° C., and especially at 650° C. the peak is maximum so that the alloy catalyst having the most excellent ordered structure can be obtained by the heating around 650° C.

Figure 2:
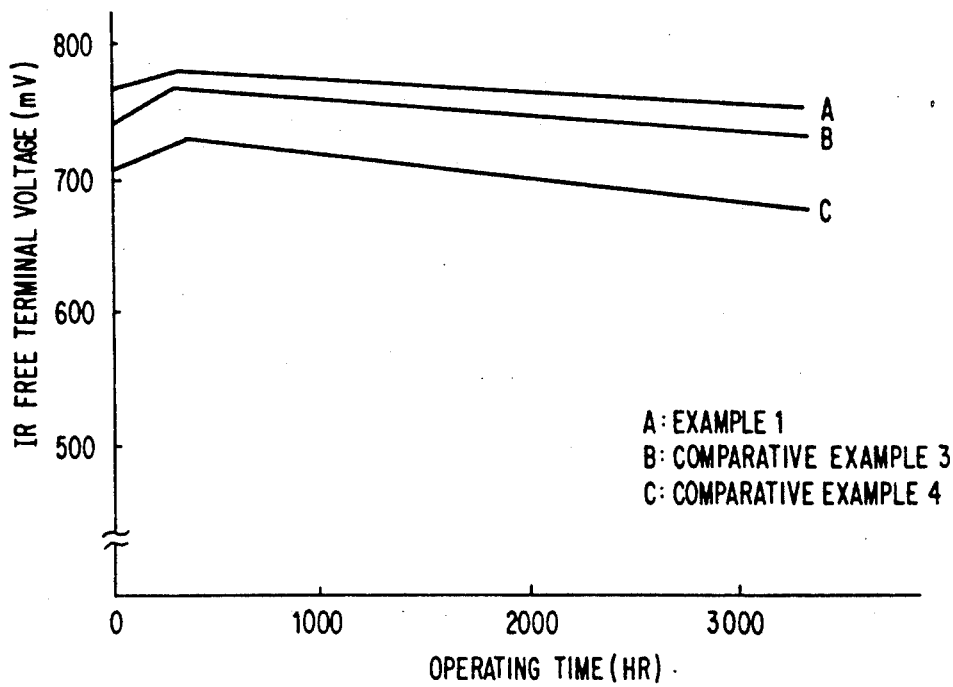
FIG. 2 is a graph showing a relation of an IR free terminal voltage with time of the electrodes of Example 1, Comparative Examples 3 and 4 employed as a single cell.

A single cell test was performed employing the respective electrodes of Example 1, Comparative Examples 3 and 4 and 105% phosphoric acid as an electrolyte at a current density of 200 mA/cm$^2$ and at 200° C. to measure the variation of an IR free terminal voltage with time. The results are shown in FIG. 2. It is apparent from FIG. 2 that the terminal voltage of the platinum-nickel-cobalt ordered catalyst electrode alloyed at 650° C. of Example 1 is higher than those of the platinum-iron-cobalt-copper ordered catalyst electrode alloyed at 900° C. and of the platinum-nickel-cobalt catalyst electrode alloyed at 900° C. of Comparative Examples having no ordered structure and the former is superior in respect to activity.

TABLE 1

| | Heating Temp. (°C.) | Heating Time (hr) | Alloy Structure | Ratio of Diffraction Peaks (100)/(111) (peak of 650° C. is 100) |
| --- | --- | --- | --- | --- |
| Comp. Ex. 5 | 500 | 10 | disorder | 0 |
| Example 4 | 600 | 10 | order | 75 |
| Example 1 | 650 | 10 | order | 100 |
| Example 3 | 700 | 10 | order | 50 |
| Example 2 | 900 + 650 | 1 + 10 | order | 100 |
| Comp. Ex. 2 | 800 | 10 | disorder | 0 |
| Comp. Ex. 4 | 900 | 1 | disorder | 0 |
| Comp. Ex. 1 | 900 | 11 | disorder | 0 |

In order to confirm the performance of the catalysts prepared in Examples and Comparative Examples, the respective catalysts were mixed with polytetrafluoroethylene dispersion liquid in the weight ratio of 7:3 which mixture was then applied on carbon sheets having been hydrophobically treated and sintered to make electrodes. A single cell test and a stability test were carried out under the below conditions employing the above respective catalysts.

Figure 3:
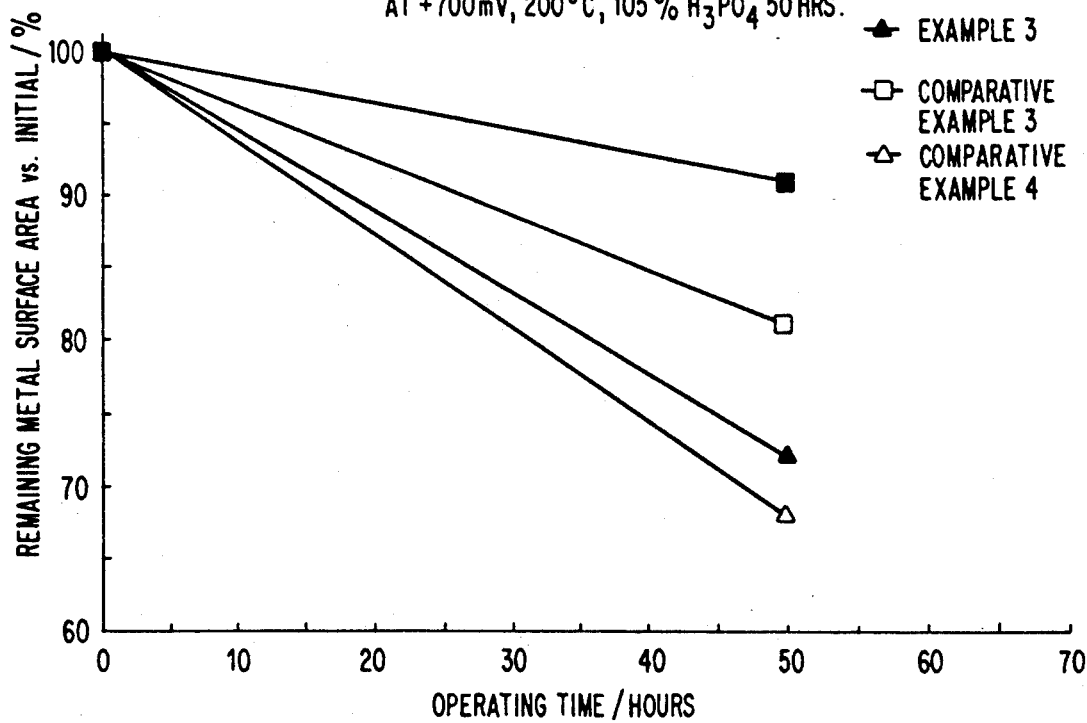
FIG. 3 is a graph showing a relation of ECMSA with time of the electrodes of Examples 1 and 3 and Comparative Examples 3 and 4 employed in a test cell.

The respective electrodes were dipped in a test cell in which 50 ml of 105% phosphoric acid was placed which was maintained for 50 hours at 200° C. at a constant potential of +700 mV (vs.RHE) in a nitrogen atmosphere. The metal surface areas (ECMSA) of the four electrodes (Examples 1 and 3 and Comparative Examples 3 and 4) out of the seven electrodes after the test were measured and compared with ECMSA before the test. The stabilities of the respective electrodes were evaluated from the above results as a retention ratio of ECMSA to obtain the results shown in FIG. 3. It is apparent that the metal surface area of the electrode of Example 1 after the lapse of 50 hours is 91% which is highest among the four electrodes, that of Example 3 is 72%, that of Comparative Example 3 is 81% and that of Comparative Example 4 is 68% and the alloy catalyst of Example 1 is superior also in respect to durability.

What is claimed is:

1. A platinum alloy catalyst which comprises an electroconductive support and platinum-nickel-cobalt alloy particles having an ordered structure supported on the electroconductive support.

2. A process of preparing a platinum alloy electrocatalyst which comprises supporting platinum, nickel and cobalt on an electroconductive support and alloying the metals to support the platinum-nickel-cobalt ternary alloy particles on the electroconductive support by heating characterized in that the thermal alloying is performed at the temperature range from 600° C. to less than 800° C. to form the alloy particles having an ordered structure.

* * * * *